(12) United States Patent
Zou

(10) Patent No.: US 12,201,094 B2
(45) Date of Patent: Jan. 21, 2025

(54) PET FEEDING BOWL ASSEMBLY

(71) Applicant: SUMPET TECHNOLOGY (QINGDAO) CO. LTD., Qingdao (CN)

(72) Inventor: Zhibin Zou, Qingdao (CN)

(73) Assignee: SUMPET TECHNOLOGY (QINGDAO) CO. LTD., Qingdao (CN)

( * ) Notice: Subject to any disclaimer, the term of this patent is extended or adjusted under 35 U.S.C. 154(b) by 0 days.

(21) Appl. No.: 17/860,867

(22) Filed: Jul. 8, 2022

(65) Prior Publication Data
US 2023/0404027 A1   Dec. 21, 2023

(30) Foreign Application Priority Data

Jun. 17, 2022 (CN) .......................... 202221532609.X

(51) Int. Cl.
*A01K 5/01* (2006.01)

(52) U.S. Cl.
CPC .................................. *A01K 5/0128* (2013.01)

(58) Field of Classification Search
CPC .................................................. A01K 5/0128
USPC ........................................................ 119/61.5
See application file for complete search history.

(56) References Cited

U.S. PATENT DOCUMENTS

| | | | | |
|---|---|---|---|---|
| 3,991,719 A * | 11/1976 | Bruce | ................... | A01K 5/0128 119/61.5 |
| 4,270,490 A * | 6/1981 | Kopp | ................... | A01K 5/0114 119/61.5 |
| 5,060,800 A * | 10/1991 | Bodet | ................... | B65D 85/72 493/110 |
| 5,140,134 A * | 8/1992 | Reusche | ............. | A47J 36/2483 392/444 |
| 5,205,242 A * | 4/1993 | Kasselman | .......... | A01K 5/0142 119/61.53 |
| 5,787,839 A * | 8/1998 | Magnant | ................ | B65D 25/32 206/545 |
| 6,125,790 A * | 10/2000 | Breedwell | ............ | A01K 5/0142 119/51.5 |
| 7,510,096 B2 * | 3/2009 | Wang | ................... | B65D 21/083 206/508 |
| 8,011,205 B2 | 9/2011 | Roth et al. | | |
| 8,464,658 B2 * | 6/2013 | Lanter | .................. | A01K 5/0114 119/61.52 |
| 8,807,082 B1 * | 8/2014 | Alfonso | ............... | A01K 5/0142 119/51.5 |

(Continued)

FOREIGN PATENT DOCUMENTS

CN      215012511 U  * 12/2021
EP      3266302 A1  *  1/2018

*Primary Examiner* — Monica L Perry
*Assistant Examiner* — Brittany A Lowery
(74) *Attorney, Agent, or Firm* — Calfee, Halter & Griswold LLP

(57) ABSTRACT

A feeding bowl assembly for pets is proposed, comprising a first bowl base and a second bowl base separated from each other, and the tops of the first bowl base and the second bowl base are respectively provided with a first opening and a second opening, the first opening and the second opening are respectively used to set up one bowl body for holding food, wherein a third opening is provided at the bottom of the second bowl base, through which third opening the first bowl base can be received within the second bowl base.

13 Claims, 9 Drawing Sheets

(56) References Cited

U.S. PATENT DOCUMENTS

| | | | | |
|---|---|---|---|---|
| 9,339,007 B2* | 5/2016 | Roth | ............... | A01K 5/0128 |
| 9,402,371 B2* | 8/2016 | Rabideau | ............ | A01K 5/0114 |
| 9,844,205 B2* | 12/2017 | Smaldone | ............ | B65D 25/28 |
| 11,553,689 B2* | 1/2023 | Peacock | ............... | A01K 5/0114 |
| 2003/0192480 A1* | 10/2003 | Bennett | ............... | A01K 5/0128 |
| | | | | 119/61.5 |
| 2008/0017655 A1* | 1/2008 | Martel | ............... | B65D 51/28 |
| | | | | 220/574.3 |
| 2012/0210941 A1* | 8/2012 | Brown | ............... | A01K 7/005 |
| | | | | 119/61.52 |
| 2013/0019808 A1* | 1/2013 | Lathim | ............... | A01K 5/0135 |
| | | | | 119/51.01 |
| 2014/0352621 A1* | 12/2014 | Fairbanks | ............ | A01K 5/0121 |
| | | | | 119/61.5 |
| 2018/0288966 A1* | 10/2018 | McKinnon | ............ | A01K 5/0128 |

* cited by examiner

PET FEEDING BOWL ASSEMBLY

CROSS REFERENCE TO RELATED APPLICATIONS

This application claims priority to and any other benefit of Chinese Provisional Patent Application No. 202221532609.X, filed Jun. 17, 2022, the entire contents of which is incorporated by reference herein.

FIELD

The present application relates to the technical field of a pet bowl, specifically to a pet feeding bowl.

BACKGROUND

When people feed their pets, they generally buy a basic pet bowl at home and place some pet food in the pet bowl. Further, many people keep more than one pet, meaning that they usually need to buy more than two kinds of pet bowls for pets with different sizes and heights. Therefore, a new pet feeding bowl assembly is needed.

SUMMARY

The purpose of the present application is to propose a pet feeding bowl assembly or combination.

In an aspect, a feeding bowl assembly for pets is proposed, comprising a first bowl base and a second bowl base separated from each other, and the tops of the first bowl base and the second bowl base are respectively provided with a first opening and a second opening, the first opening and the second opening are respectively used to set up one bowl body for holding food, wherein a third opening is provided at the bottom of the second bowl base, through which third opening the first bowl base can be received within the second bowl base.

In some embodiments, the first bowl base is able to be stacked on top of the second bowl base to form a combination with the second bowl base.

In some embodiments, when the first bowl base is stacked on the second bowl base, the second bowl base and the first bowl base are combined with each other to form an overall smooth outer side wall.

In some embodiments, the first bowl base and the second bowl base both have profiles that taper from the bottom to the top.

In some embodiments, the assembly forms a profile that tapers from the bottom to the top when the first bowl base is stacked on the second bowl base.

In some embodiments, the feeding bowl assembly further comprises a first bowl body placed on the first opening, and a second bowl body placed on the second opening, wherein the first bowl body and the second bowl body have the same external size.

In some embodiments, the edge of the first opening of the first bowl base is provided with a first positioning recess, so that the edge of the first opening of the first bowl body placed in the first positioning recess is lower than the top surface of the first bowl base.

In some embodiments, the edge of the first opening of the first bowl base is further provided with several notches, so that part of the edge of the first opening of the first bowl body is exposed to the outer side wall of the first bowl base.

In some embodiments, the first bowl base is formed with a first accommodating cavity surrounded by a first inner shell and can accommodate the bowl body, and the bottom of the first accommodating cavity is provided with a first bottom opening; and the second bowl base is formed with a second accommodating cavity surrounded by the second inner shell and can accommodate the bowl body, and the bottom of the second accommodating cavity is provided with a second bottom opening.

In some embodiments, the first inner shell has a shape that fits with an outer wall of a bowl body received in the first bowl base, and the second inner shell has a shape that fits with an outer wall of a bowl body accommodated in the second bowl base.

In some embodiments, the bottom of the first bowl base is provided with a first limiting portion, and the top of the second bowl base is provided with a second limiting portion that can cooperate with the first limiting portion.

In some embodiments, the top surface of the second bowl base is fixed with an annular cover, and the second limiting portion comprises a limiting groove formed on the annular cover, while the first limiting portion comprises a limiting block that can be matched with the limiting groove.

In some embodiments, the edge of the second inner shell is mounted on an annular hanger formed below the annular cover.

In some embodiments, the edge of the open top of the second bowl body is provided with a second flange, and when the second bowl body is received in the second inner shell, the second flange is positioned at the top edge of the second inner shell.

In some embodiments, when the first bowl base is received inside the second bowl base, the first opening of the first bowl body is closed by the second bowl body and/or the second inner shell.

In some embodiments, when the first bowl base is stacked on top of the second bowl base, the second opening of the second bowl body is closed by the bottom of the first bowl body.

In some embodiments, the first bowl base further comprises a bottom plate, which is fixed at the first bottom opening of the first bowl base, and the bottom plate comprises a heat transfer channel, which communicates with the first bottom opening.

In some embodiments, the bowl body is a slow-feeding bowl.

The feeding bowl assembly for pets proposed by the present application, compared with the prior art, may achieve the following beneficial effects:

1. For pets of different sizes, a variety of feeding ways are achieved as follows:
   (1) The first bowl base is placed inside the inner cavity of the second bowl base so that the feeding bowl body inside the second bowl base is located above the feeding bowl body inside the first bowl base. Such usage employs the feeding bowl body inside the second bowl base as a bowl body for holding food, especially for feeding small pets.
   (2) The first bowl base is stacked on the second bowl base so that the feeding bowl body inside the first bowl base is located above the feeding bowl body inside the second bowl base to form an elevated bowl. Such usage employs the feeding bowl body inside the first bowl base as a bowl body for holding food, especially for feeding large pets.
   (3) The above two combinations achieve the goal of feeding different kinds of pets with wider applicability and meet the current demands for feeding multiple pets in a family, all without the need of preparing multiple feeding bowls for different kinds of pets.

2. The first bowl base is placed inside the inner cavity of the second bowl base so that the feeding bowl body inside the second bowl base is located above the feeding bowl body inside the first bowl base. Such state of use is convenient to carry and store.

3. To achieve heating and warming functions when the bowl body in the second bowl base is located above the first bowl body, which can be made by metal or other materials with a heat transfer function, in the second bowl base, the bowl body in the first bowl base can be filled with a heating medium, cooling medium, or insulating medium so as to heat or cool or warm up the food in the bowl body in the second bowl base. To achieve heating and warming functions when the bowl body in the first bowl base is located above the second bowl body, since the feeding bowl in the first bowl base is made of a material with thermal conductivity, such as metal, and the bowl body in the second bowl base can be filled with the heating medium or cooling medium or warm-keeping material, the food in the feeding bowl in the first bowl base can be heated or cooled.

4. To realize the function of using each bowl separately, the first bowl base and the second bowl base can be split so that the first bowl base and the second bowl base can be used as individual feeding bowls, such as the feeding bowl in the first bowl base is used for food, while the feeding bowl in the second bowl base is used for water. When the pet needs slow food, the feeding bowl in the first bowl base can be replaced with a slow-feeding bowl, or if the feeding bowl in the first bowl base is used for water, the feeding bowl body in the second bowl base can be replaced with a slow-feeding bowl when slow food is needed for pets.

In general, the pet feeding bowl assembly of the present application achieves the technical effect of possessing a variety of usages.

DETAILED EMBODIMENTS

Figure 1:
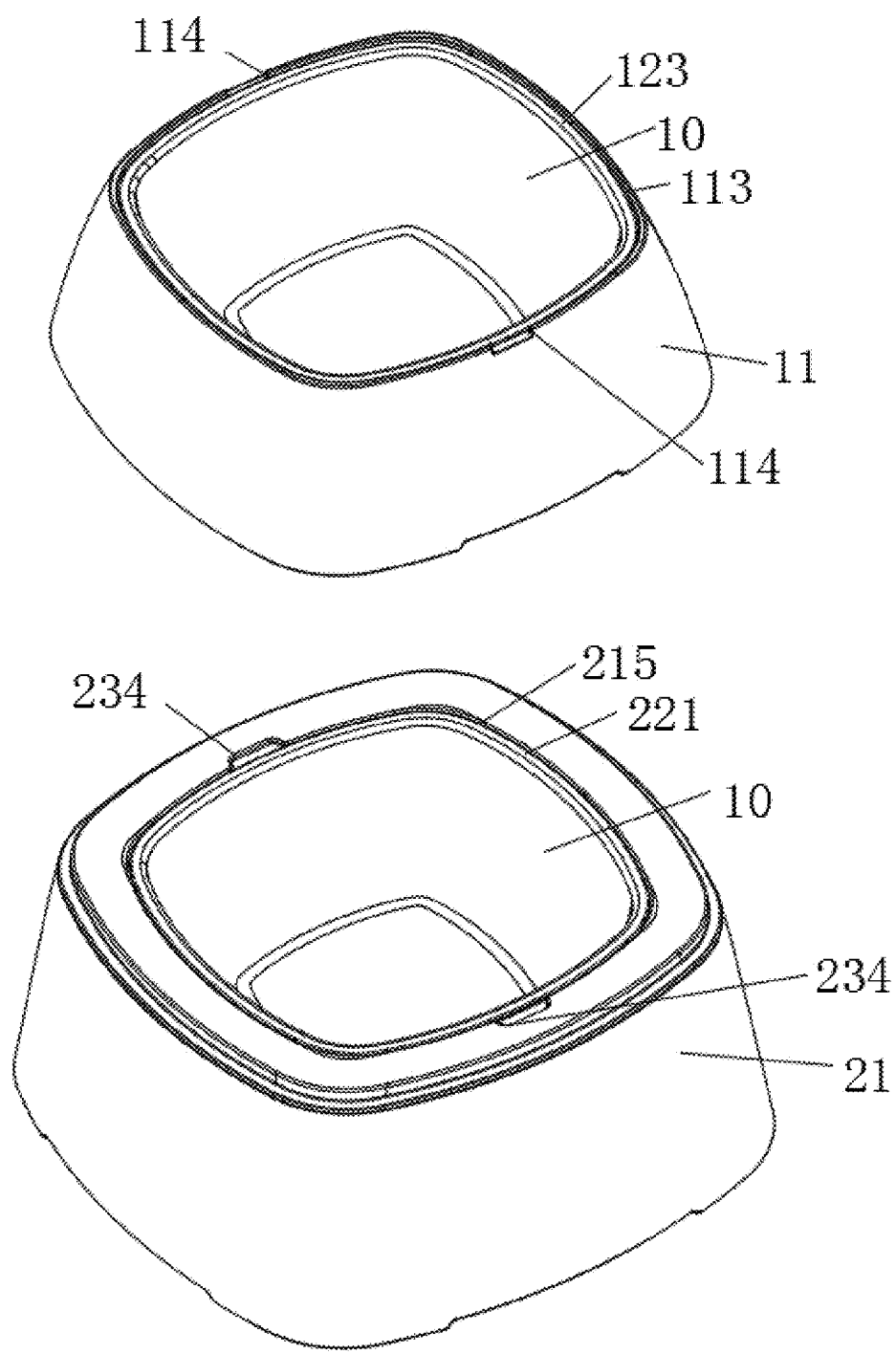
FIG. 1 is a schematic diagram of an explosion structure (I) of a bowl assembly according to one embodiment.
Figure 2:
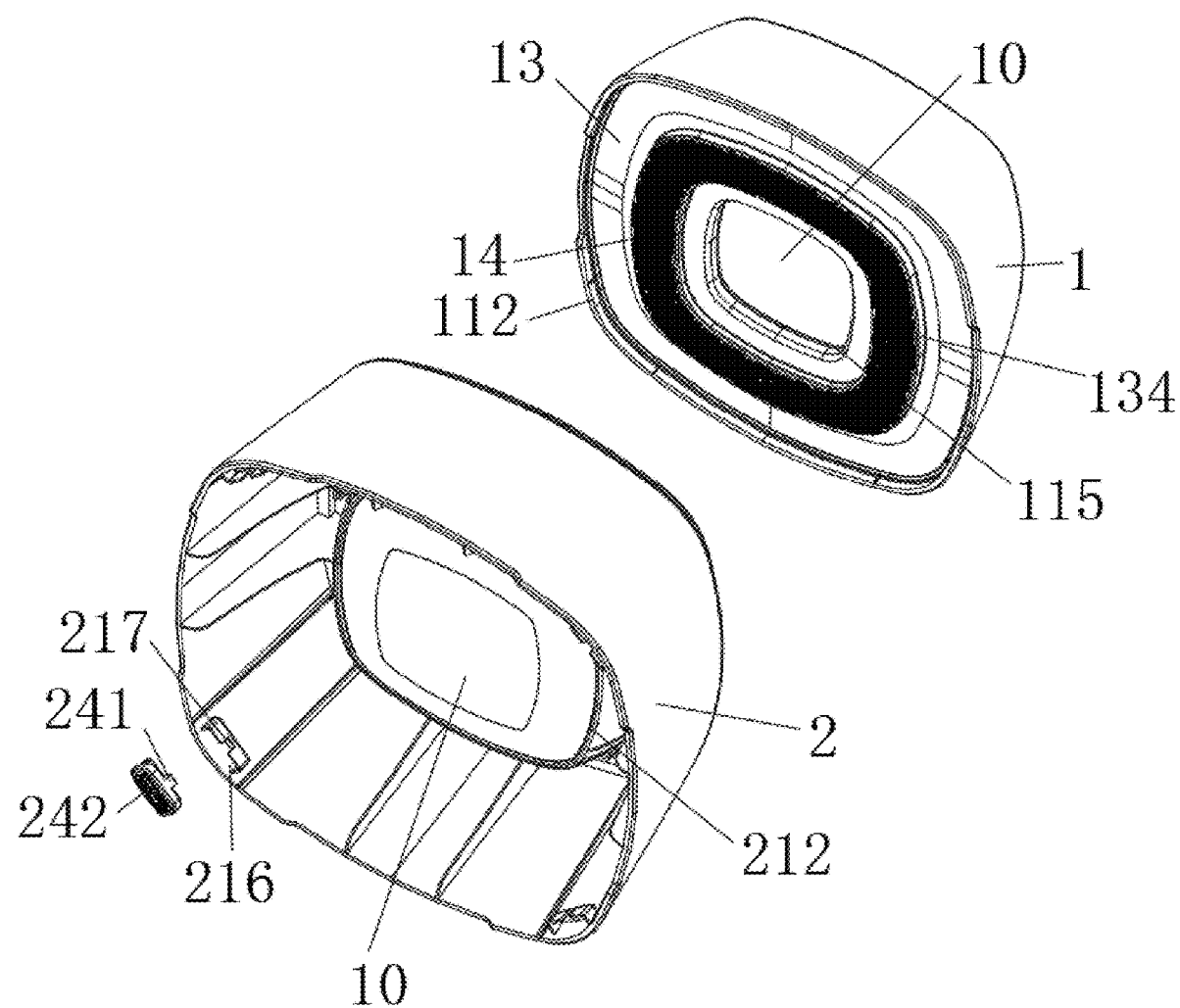
FIG. 2 is another schematic diagram of an explosion structure (II) of a bowl assembly according to one embodiment.
Figure 3:
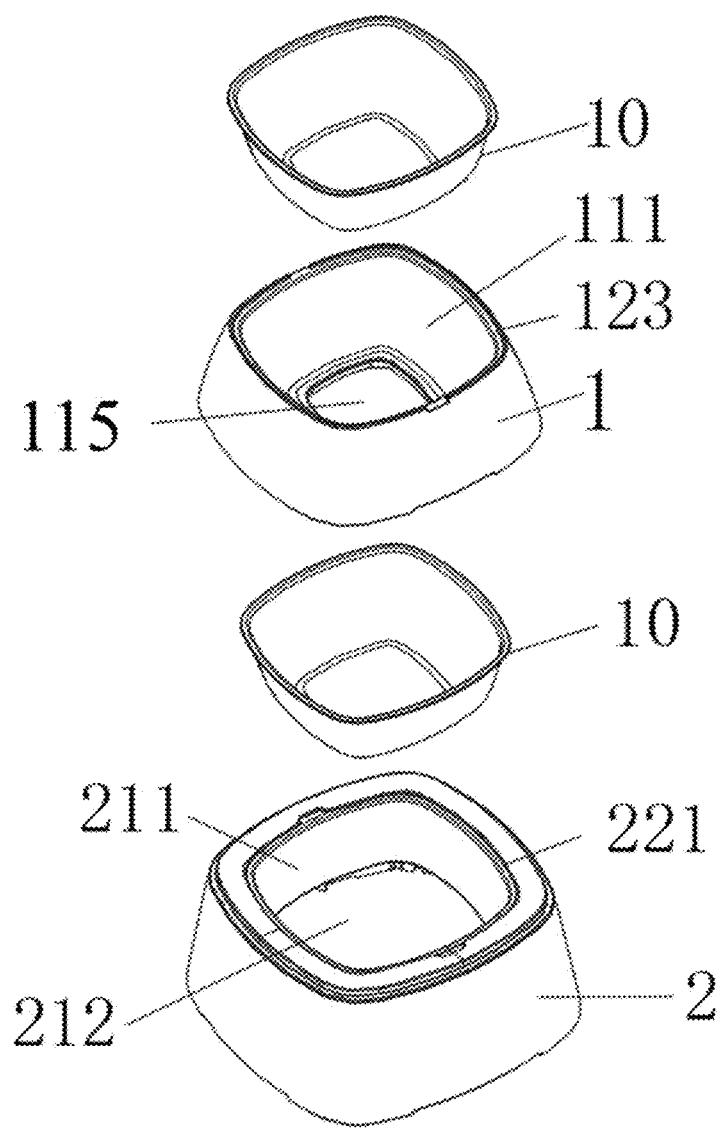
FIG. 3 is another schematic diagram of an explosion structure (III) of a bowl assembly according to one embodiment.
Figure 4:
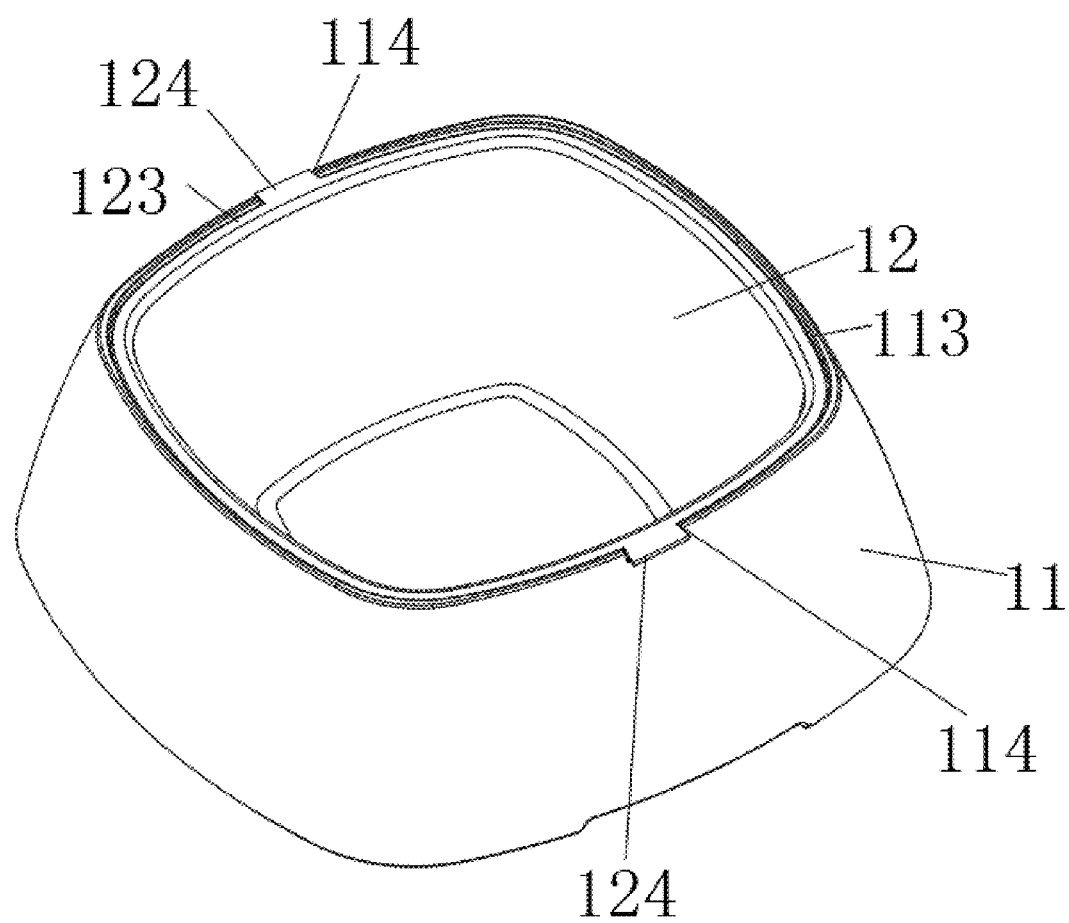
FIG. 4 is a schematic diagram of structure of a first bowl base of a bowl assembly according to one embodiment.
Figure 5:
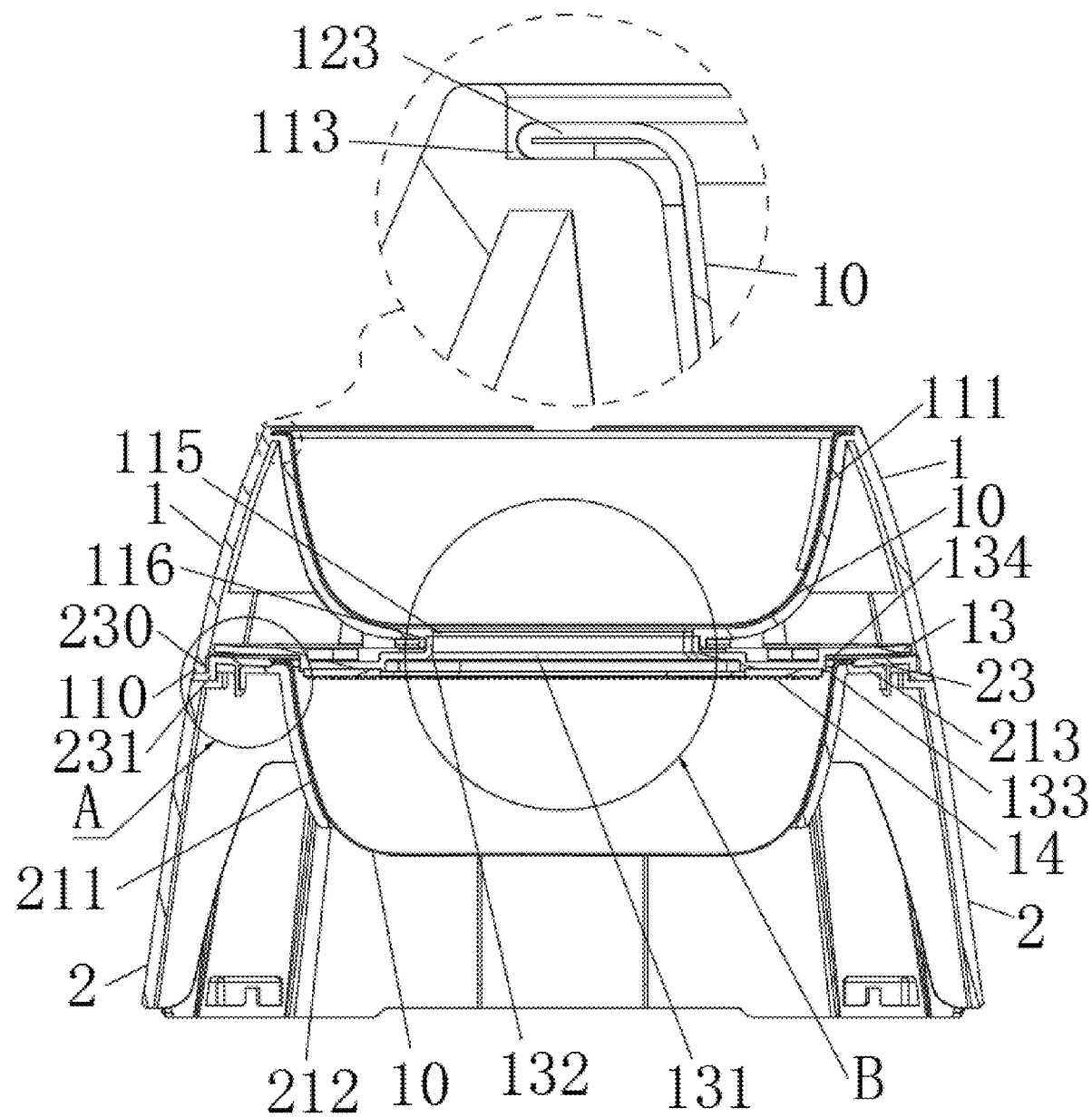
FIG. 5 is a schematic diagram of structure of a first bowl base and a second bowl base stacked on top of each other and combined according to one embodiment.
Figure 6:
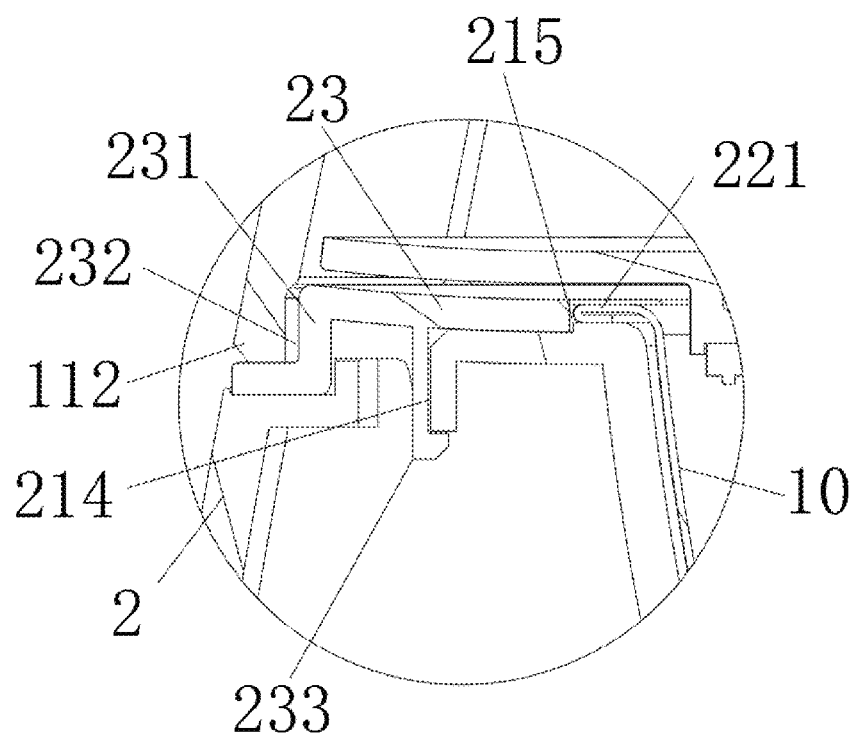
FIG. 6 is an enlarged view for A zone in FIG. 5.
Figure 7:
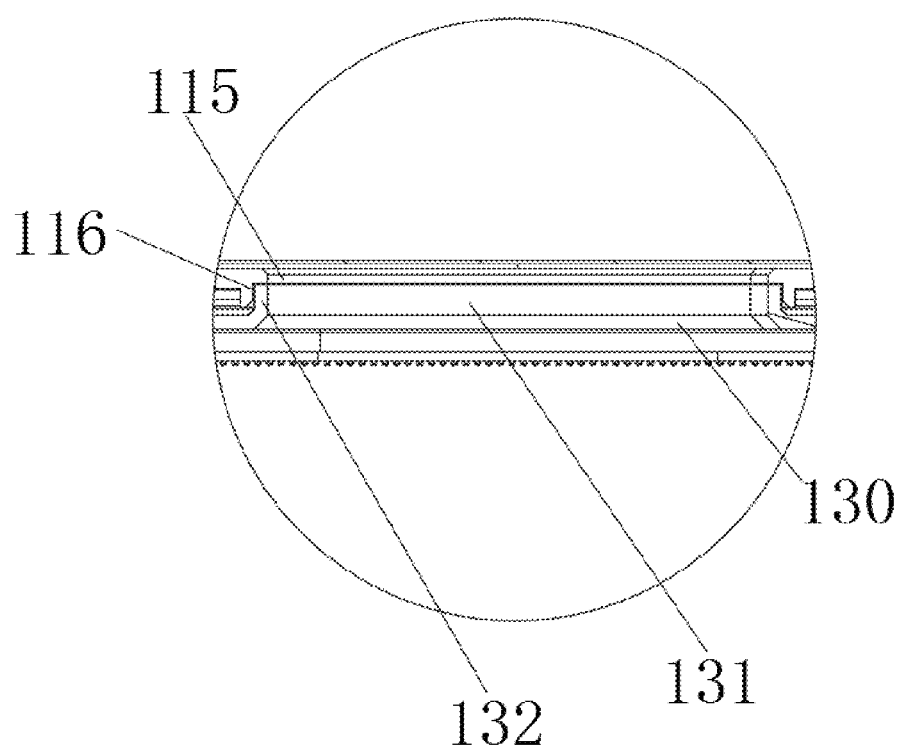
FIG. 7 is an enlarged view at B zone in FIG. 5.
Figure 8:
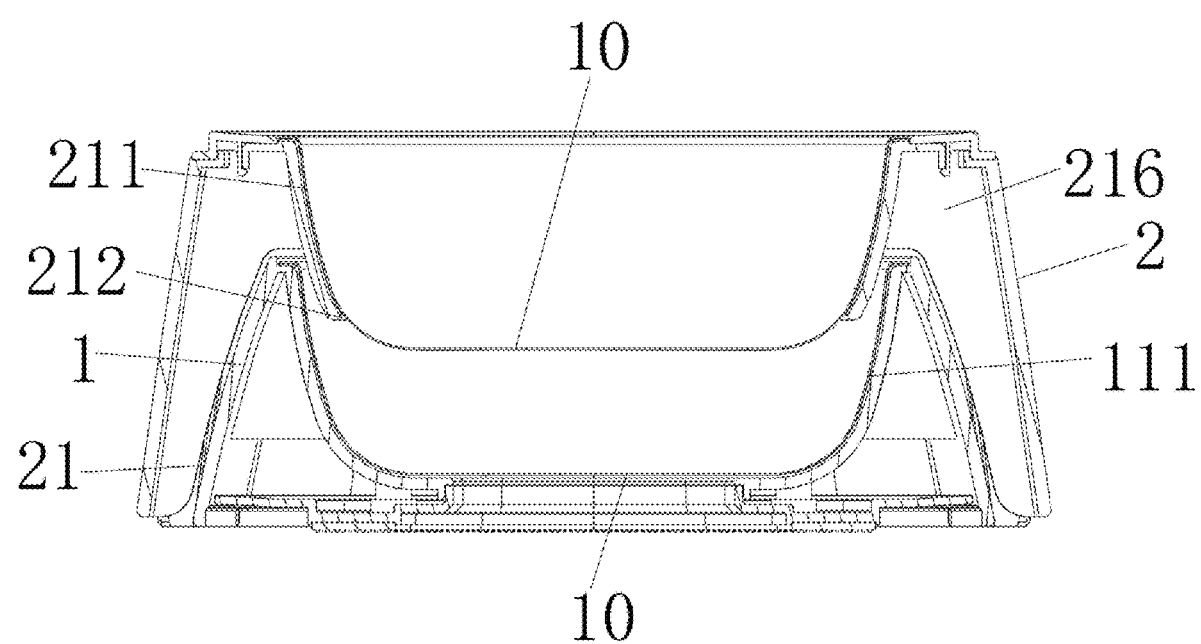
FIG. 8 is a schematic diagram of a structure when the first bowl base is placed within an accommodating cavity of the second bowl base.

The following will be a clear and complete description of the technical solutions in the present application embodiments in conjunction with the accompanying drawings in the present application embodiments. Obviously, the described embodiments are only a part of the present application embodiments, and not all of them. Based on the embodiment in the present application, all other embodiments obtained by a person of ordinary skill in the field fall within the scope of protection of the present application.

As shown in FIGS. 1-7, the pet feeding bowl assembly described in this embodiment comprises a first bowl base 1 and a second bowl base 2 that can accommodate a feeding bowl body 10 respectively, while said first bowl base 1 and second bowl base 2 are set independently of each other, so that the first bowl base 1 and second bowl base 2 can be used independently. When the first bowl base 1 and second bowl base 2 are accommodated with a feeding bowl body 10 respectively, as an example of the use, the feeding bowl body 10 in the first bowl base 1 is used for food, and the feeding bowl body 10 in the second bowl base 2 is used for water, or both bowl bodies can be filled with water or food at the same time to facilitate the feeding of multiple pets.

In this embodiment, a first accommodating cavity 111 in which the feeding bowl body 10 can be installed is formed in the first bowl base 1, and a first bottom opening 115 is opened at the bottom of the first accommodating cavity 111. Besides, a second accommodating cavity 211 in which another feeding bowl body 10 can be installed is formed in the second bowl base 2, and the second bowl base 2 is formed with a second bottom opening 212. Therein, the first bowl base 1 and the second bowl base 2 may be both made of plastic materials, and both the feeding bowl bodies 10 in the first bowl base and in the second bowl base may be made of a material with thermal conductivity, generally a metal like stainless steel. The second bottom opening 212 is arranged so that when the feeding bowl body 10 in the second bowl base 2 is located above the feeding bowl body 10 in the first bowl base 1, after a cooling medium or hot medium or heat preservation material is put into the feeding bowl body 10 in the first bowl base 1, the cooling source of the cooling medium or the heating source of the heating medium is conducted to the feeding bowl body 10 in the second bowl base 2 through the second bottom opening 212.

In some embodiments, the feeding bowl accommodated in the first accommodating cavity 111 is provided with a first flange 123 on the edge of the bowl mouth, and the first opening of the first bowl base 1 located in the first accommodating cavity 111 is formed with a first positioning depression 113 matched with the first flange 123, and the first flange 123 is located in the first positioning depression 113 during the feeding bowl, and is accommodated in the first accommodation cavity. The inner wall of the first positioning depression 113 on the outer side is provided with at least one notch 114. Wherein the notch 114 is provided to facilitate the removal of the feeding bowl body 10 from the first accommodating cavity 111 for easy cleaning.

In some embodiments, the first flange 123 is provided with at least one lug 124, which correspondingly is located in the notch 114. The configuration of the lug 124 matching with the notch 114 facilitates the removal of the feeding bowl body 10 in the first bowl base from the first accommodating cavity 111.

In some embodiments, the bottom of the first bowl base 1 is provided with a first limit portion 110, and the top of the first bowl base 1 is provided with a second limit portion 230 that can cooperate with the first limit portion 110, so as primarily to make the first bowl base 1 and the second bowl base 2 assembled to each other when the first bowl base 1 and the second bowl base 2 are stacked above and below each other, and to prevent the first bowl base 1 located above from moving around during the pet eating the food in the first bowl 12.

In some embodiments, the first bowl base 1 comprises a bottom plate 13, which can be made of plastic material. The bottom plate 13 can be fixed at a first bottom opening 115 of the first bowl base 1, and the bottom plate 13 comprises a through-hole 130 and a tube 132 formed on the through-hole 130, which form a heat transfer channel 131 together, and the tube 132 is connected to the first bottom opening 115. The lower edge of the first bottom opening 115 is formed with a first blocking part 116, and the upper end of the tube 132 is positioned against the first blocking part 116. Such structure is made to seal the bottom of the first bowl base and prevent debris from entering. Further, after the lower bowl body is filled with the cooling or heating medium, the structure of the tube body is used to make the cooling or heating medium have a guiding contact with the upper bowl, prompting heating or cooling of the upper bowl, so that the food is heated or cooled to further enhance the use effect. The bottom plate is fixed to the first bowl base 1 by bolts or screws, wherein the first blocking part 116 is a ring-shaped blocking ring, or composed by a plurality of ring-shaped array of blocking blocks.

The bottom of said first bowl base 1 can fit with the top surface of said second bowl base 2, and when the bottom surface of said first bowl base 1 is placed on the top surface of said second bowl base 2, a feeding bowl body 10 is placed on said first bowl base 1 to form a feeding way suitable for large pets.

In some embodiments, when the first bowl base is stacked on top of the second bowl base the second opening of the second bowl body is closed by the bottom of the first bowl body. Such structure will promote a heating or cooling effect for the food in the first bowl body when a heating or cooling medium is provided in the second bowl body.

The outer side of the first bowl base 1 fits the inner cavity of the second bowl base 2, and when the first bowl base 1 is placed inside the second bowl base 2, the feeding bowl body 10 is placed inside the second bowl base 2 to feed small pets.

In some embodiments, when the first bowl base is received inside the second bowl base, the first opening of the first bowl body is closed by the second bowl body and/or the second inner shell. Such structure will promote heating or cooling effect for the food in the second bowl body when heating or cooling medium is provided in the first bowl body.

When slow feeding is required, the feeding bowl body 10 placed inside the first bowl base 1 or the second bowl base 2 can be replaced with a slow-feeding bowl 3. For example, the slow-feeding bowl 3 may comprise a plurality of mutually spaced convex posts 31.

In some embodiments, the bottom surface of the bottom plate 13 is provided with an anti-slip structure 14, which may comprise an anti-slip pattern formed on the bottom surface of the bottom plate, an annular anti-slip pad fixed to the bottom surface of the bottom plate, or a plurality of anti-slip blocks distributed in a decentralized manner on the bottom surface of the bottom plate. When the first bowl base 1 is used alone and placed on the ground, the anti-slip structure 14 touches the ground and plays an anti-slip role. When the anti-slip structure 14 is the anti-slip pattern, the anti-slip pattern is manufactured by integral molding. When the anti-slip structure 14 is the annular anti-slip pad, the annular anti-slip pad is fixed to the bottom surface of the bottom plate by glue. When the anti-slip structure 14 is a plurality of anti-slip blocks, the plurality of anti-slip blocks are fixed to the bottom surface of the bottom plate by glue, wherein the ring-shaped anti-slip pad or anti-slip block is made of rubber material respectively.

In some embodiments, the top surface of the second bowl base 2 is provided with a annular cover 23 which comprises a limiting slot 232 formed thereon, while the first limit portion 110 comprises a limiting portion 112 that can be fitted with the limiting slot 232. The annular cover 23 can be fastened by means of a buckle snap and a buckle hole, or can be fixed by means of a bolt connection or by means of welding. However, when the bottom surface of said first bowl base 1 is placed on the top surface of the second bowl base 2, the limiting block 112 is embedded in the limiting slot 232. In order to make the positioning of the bottom surface of the first bowl base 1 on the top surface of said second bowl base 2 more solid, a plurality of limiting slots 232 (231) and limiting blocks 112 can be provided, which are spaced apart from each other. The edge of the second inner shell 214 is mounted on an annular hanger 233 formed below the annular cover 23.

The second bowl base 2 may have another anti-slip structure 24, which may comprise several anti-slip blocks 242 and several sockets 216. The plurality of anti-slip blocks 242 are inserted in the sockets 216, respectively. Specifically, the side wall of the socket 216 is provided with a slot 217, and the side wall of the anti-slip block 242 is provided with an extending portion 241, which is correspondingly stuck into the slot 217. The annular anti-slip pad or anti-slip block may be made of a rubber material respectively.

Figure 9:
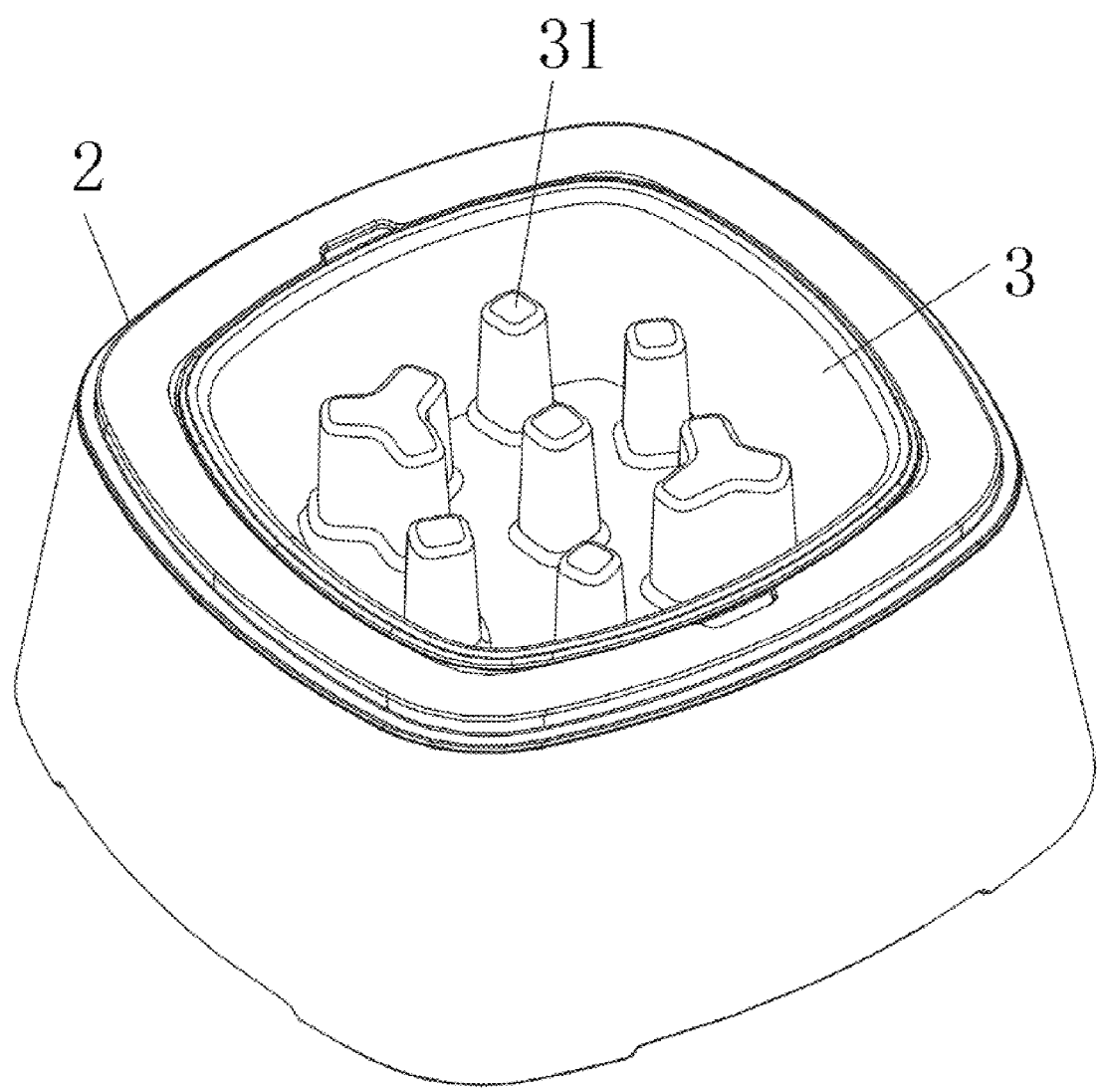
FIG. 9 is a schematic diagram of a structure in which the first bowl body in the first bowl base is replaced with a slow-feeding bowl.
Figure 10:
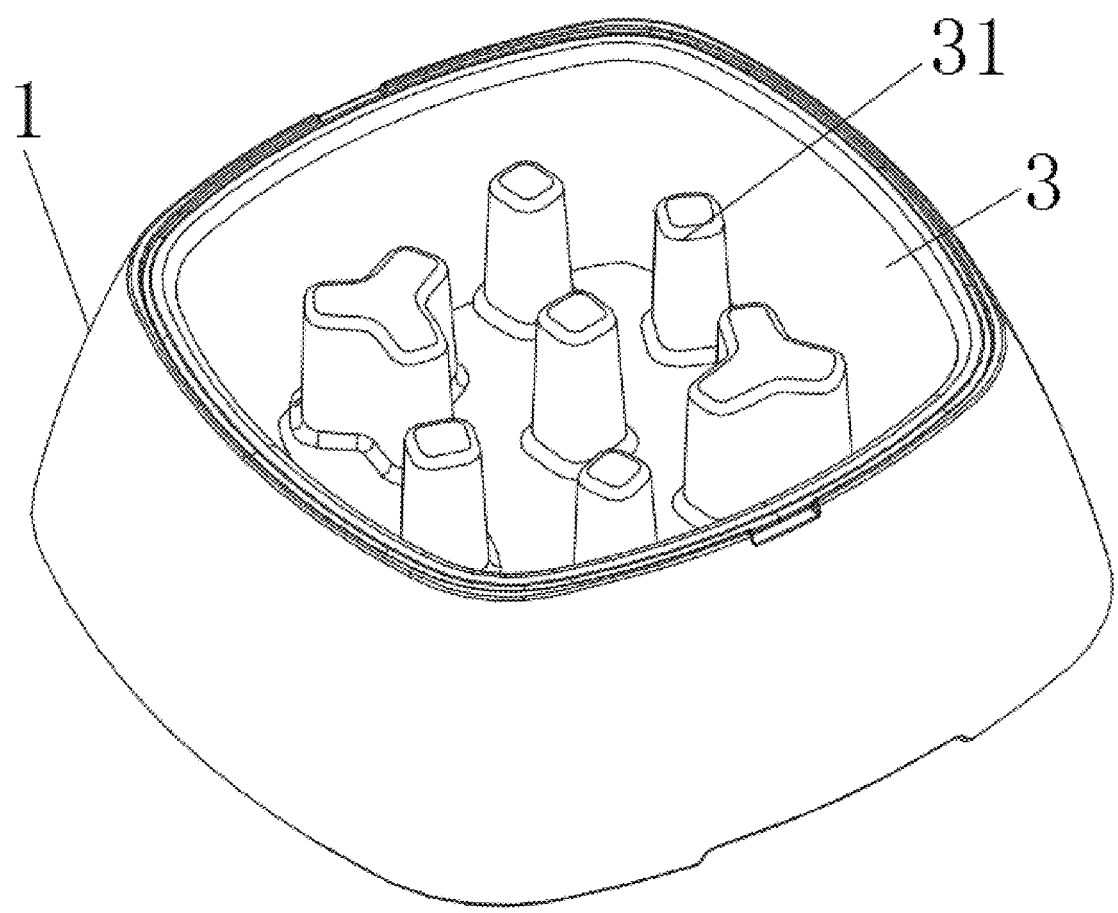
FIG. 10 is a schematic diagram of the a structure in which the second bowl body in the second bowl base is replaced with a slow-feeding bowl.

As shown in FIGS. 9 to 10, the bowl body placed in the first bowl base 1 or the second bowl base 2 may be replaced by a slow-feeding bowl 3, which have several individual projections therein.

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, circuits, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed:

1. A feeding bowl assembly for pets, comprising: a first bowl base and a second bowl base separated from each other, and the tops of the first bowl base and the second bowl base are respectively provided with a first opening and a second opening, the first opening and the second opening are respectively used to set up one bowl body for holding food, wherein a third opening is provided at the bottom of the second bowl base, through which the first bowl base is configured to be received within the second bowl base, and wherein the first bowl base is configured to be stacked on top of the second bowl base to form a combination with the second bowl base,
wherein the first bowl base is formed with a first accommodating cavity surrounded by a first inner shell and can accommodate the bowl body, and the bottom of the first accommodating cavity is provided with a first bottom opening; and the second bowl base is formed with a second accommodating cavity surrounded by the second inner shell and can accommodate the bowl body, and the bottom of the second accommodating cavity is provided with a second bottom opening;
wherein the first inner shell has a shape that fits with an outer wall of a bowl body received in the first bowl base, and the second inner shell has a shape that fits with an outer wall of a bowl body accommodated in the second bowl base;
wherein the bottom of the first bowl base is provided with a first limiting portion, and the top of the second bowl base is provided with a second limiting portion that can cooperate with the first limiting portion; and
wherein the top surface of the second bowl base is fixed with an annular cover, and the second limiting portion comprises a limiting groove formed on the annular cover, while the first limiting portion comprises a limiting block that can be matched with the limiting groove.

2. The feeding bowl assembly of claim 1, wherein when the first bowl base is stacked on the second bowl base, the second bowl base and the first bowl base are combined with each other to form an overall smooth outer side wall.

3. The feeding bowl assembly of claim 2, wherein the first bowl base and the second bowl base both have profiles that taper from the bottom to the top.

4. The feeding bowl assembly of claim 3, wherein the assembly forms a profile that tapers from the bottom to the top when the first bowl base is stacked on the second bowl base.

5. The feeding bowl assembly of claim 1, wherein the feeding bowl assembly further comprises a first bowl body placed on the first opening, and a second bowl body placed on the second opening, wherein the first bowl body and the second bowl body have the same external size.

6. The feeding bowl assembly according to claim 5, wherein the edge of the first opening of the first bowl base is provided with a first positioning recess so that the edge of the opening of the first bowl body placed in the first positioning recess is lower than the top surface of the first bowl base.

7. The feeding bowl assembly according to claim 6, wherein the edge of the first opening of the first bowl base is further provided with several notches, so that part of the edge of the first opening of the first bowl body is exposed from the outer side wall of the first bowl base.

8. The feeding bowl assembly of claim 1, wherein the edge of the second inner shell is mounted on an annular hanger formed below the annular cover.

9. The feeding bowl assembly according to claim 1, wherein the edge of the open top of the second bowl body is provided with a second flange, and when the second bowl body is received in the second inner shell, the second flange is positioned at the top edge of the second inner shell.

10. The feeding bowl assembly of claim 5, wherein when the first bowl base is received inside the second bowl base and the first opening of the first bowl body is closed by the second bowl body and/or the second inner shell.

11. The feeding bowl assembly of claim 5, wherein when the first bowl base is stacked on top of the second bowl base, the second opening of the second bowl body is closed by the bottom of the first bowl body.

12. A feeding bowl assembly for pets, comprising: a first bowl base and a second bowl base separated from each other, and the tops of the first bowl base and the second bowl base are respectively provided with a first opening and a second opening, the first opening and the second opening are respectively used to set up one bowl body for holding food, wherein a third opening is provided at the bottom of the second bowl base, through which the first bowl base is configured to be received within the second bowl base, and wherein the first bowl base is configured to be stacked on top of the second bowl base to form a combination with the second bowl base, wherein the first bowl base is formed with a first accommodating cavity surrounded by a first inner shell and can accommodate the bowl body, and the bottom of the first accommodating cavity is provided with a first bottom opening; and the second bowl base is formed with a second accommodating cavity surrounded by the second inner shell and can accommodate the bowl body, and the bottom of the second accommodating cavity is provided with a second bottom opening; and
wherein the first bowl base further comprises a bottom plate, which is fixed at the first bottom opening of the first bowl base, and the bottom plate comprises a heat transfer channel which communicates with the first bottom opening.

13. The feeding bowl assembly for pets of claim 1, wherein the bowl body is a slow-feeding bowl.

* * * * *